United States Patent
Uegaki

(10) Patent No.: US 7,039,620 B2
(45) Date of Patent: May 2, 2006

(54) CAI SYSTEM AND READABLE-BY-COMPUTER RECORDING MEDIUM RECORDED WITH PROGRAM

(76) Inventor: Tateo Uegaki, 8-3, Sakae 1-chome, Miyagino-ku, Sendai-shi, Miyagi 983-0011 (JP)

( * ) Notice: Subject to any disclaimer, the term of this patent is extended or adjusted under 35 U.S.C. 154(b) by 466 days.

(21) Appl. No.: 09/958,865

(22) PCT Filed: Feb. 14, 2001

(86) PCT No.: PCT/JP01/01041

§ 371 (c)(1),
(2), (4) Date: Oct. 12, 2001

(87) PCT Pub. No.: WO01/59739

PCT Pub. Date: Aug. 16, 2001

(65) Prior Publication Data

US 2002/0156755 A1    Oct. 24, 2002

(30) Foreign Application Priority Data

Feb. 14, 2000  (JP) ............................... 2000-35951

(51) Int. Cl.
*G06F 15/18*   (2006.01)
(52) U.S. Cl. .......................................... 706/16; 706/25
(58) Field of Classification Search ................ 706/16, 706/25
See application file for complete search history.

(56) References Cited

U.S. PATENT DOCUMENTS 6,347,303 B1 *   2/2002   Nagai et al. .................. 705/7

FOREIGN PATENT DOCUMENTS

| JP | 6-250582 | 9/1994 |
|---|---|---|
| JP | 6-274536 | 9/1994 |
| JP | 8-76680 | 3/1996 |
| JP | 9-62651 | 3/1997 |
| JP | 5-11679 | 1/2003 |

* cited by examiner

*Primary Examiner*—George Davis
(74) *Attorney, Agent, or Firm*—Knobbe, Martens, Olson & Bear, LLP

(57) ABSTRACT

A CAI system for vehicle repair workers is disclosed. The CAI system for supporting an instruction for one group consisting of a plurality of training participants includes a storage device for storing attribute data of each participant, a keyboard for inputting degree-of-master basic data of each participant for every plurality of instruction items, and a control unit for processing the data, the control unit evaluates a degree of master of each participant for every instruction item, calculates an overall evaluation of the concerned instruction item of the target group, selects the instruction item exhibiting a low degree of master by comparing the overall evaluations of the concerned instruction item, and selects which instruction target person should be instructed with respect to the selected instruction item. The CAI system is capable of efficiently enhancing a working efficiency of one working group consisting of the plurality of workers.

5 Claims, 18 Drawing Sheets

JUDGEMENT OF INSTRUCTOR

CAI SYSTEM AND READABLE-BY-COMPUTER RECORDING MEDIUM RECORDED WITH PROGRAM

This application is the U.S. National Phase under 35 U.S.C. §371 of International Application PCT/JP01/01041, filed Feb. 14, 2001, which claims priority based on JP 2000-35951, filed Feb. 14, 2000. The International Application was not published under PCT Article 21(2) in English.

TECHNICAL FIELD

The present invention relates generally to a computer aided instruction (CAI) system, and more particularly to a CAI system for instructing a vehicle repair worker.

BACKGROUND ARTS

What is known as a computer aided instruction (CAI) system is a system for supporting a learner to learn at a high efficiency by outputting to a learner terminal a set of information in a data file stored with instructional aid data in a predetermined sequence.

Further, what can be considered as an instruction system for training, e.g., in-office able staff may be a system in which communication terminals are provided on a head-office side and on a branch-office side, and instruction contents specified from the head-office side are efficiently transferred to the branch-office side.

On the other hand, in the case of instructing an automobile repair worker in an automobile maintenance/sheet metal work shop or the like, a skilled worker directly guides an unskilled worker in each repair shop. Then, the present situation in the great majority of working places Is that the unskilled worker performs nothing better than watching and following the work of the skilled worker.

Considering herein the repair of the automobile, a damage to an external plate panel etc of the automobile is repaired by expert workers In sheet metal work and coating in the repair shop, and a high quality of sheet metal work and coating involves a long experience. Then, it takes a comparatively long period of time to repair the damaged vehicle by the sheet metal work and coating, and hence a cost for repairing the vehicle tends to increase due to a length of an absolute time of the work and a deficiency of the skilled workers.

It can be further considered that one single vehicle is repaired by one team consisting of three or four workers in the repair shop. If the workers differ in their capability of repair work, however, it might happen the team is unable to progress the work at a high efficiency in some cases. Moreover, each worker has a forte and a weak In the work field (e.g., the sheet metal work is forte, however, the coating work is the weak), which is also a factor for hindering the smooth repair work.

Then, such a poor productivity in the repair shop comes to the fore, resulting in a rise in the vehicle repair cost and an increase in the working time of the worker.

On the other hand, most of the car insurance has exemption special policy condition of approximately 50,000 yen, so that the user (car owner) can not apply the insurance to a light damage and patiently continues to use the car remaining damaged. This is because the repair of even the slight damage to the surface of the car body requires some ton thousands yen. If possible of decreasing the repair cost, it can be expected that there increase the number of the users making the repair at their own expenses even when unable to use the car insurance. Further, the insurance company, if the repair cost decreases, can provide the users with an insurance item with no exemption special policy condition at a low price.

It is an object of the present invention, which was devised in view of the items described above, to provide the CAI system capable of efficiently enhancing the work efficiency of one work group consisting of a plurality of workers.

It is another object of the present invention to provide the CAI system enabling a comparatively short-experienced worker to repair the vehicle in a short period of time in a way that keeps a preferable quality.

DISCLOSURE OF THE INVENTION

According to the present invention, an instruction support system for supporting an instruction of one instruction target group consisting of a plurality of instruction target persons, comprises a storing means for storing attribute data of each instruction target person, an inputting means for inputting degree-of-master basic data of each instruction target person with respect to each of a plurality of instruction items, an instruction item evaluating means for evaluating a degree of master of each instruction target person with respect to each instruction item, an instruction item overall evaluating means for calculating an overall evaluation of the concerned instruction item of one instruction target group on the basis of an evaluation result obtained by the instruction item evaluating means, an instruction item selecting means for selecting the instruction item exhibiting a low degree of master by comparing the overall evaluations of the respective instruction items which are obtained by the instruction item overall evaluating means, and an instruction target person selecting means for selecting which instruction target person is selected for receiving the instruction item selected by the instruction item selecting means.

According to the present invention, it is feasible to easily judge which worker is given the priority of the instruction in order to enhance the work efficiency of the group as a whole with respect to the work item exhibiting a low degree of master among the work items in one entire work group.

Further, the instruction target person selecting means may select the instruction target person exhibiting a low degree of master with respect to the instruction item selected by the instruction item selecting means among the instruction target persons.

Therefore, the worker exhibiting the low degree of master can be selected and given the priority of the instruction with respect to the work item showing the low degree of master among the work items in one entire work group, whereby the work efficiency of the group as a whole can be easily enhanced.

Moreover, the instruction target person selecting means may select the instruction target person exhibiting the low degree of master with respect to the instruction item selected by the instruction item selecting means among the instruction target persons excluding the instruction target persons exhibiting a high degree of master with respect to the instruction items other than the instruction item selected by the instruction item selecting means.

Therefore, among the instruction target persons excluding the instruction target persons exhibiting a high degree of master with respect to the instruction item other than the selected instruction item, the worker exhibiting the low degree of master can be selected and given the priority of the instruction with respect to the work item showing the low degree of master among the work items in one entire work group. Accordingly, the work group can consist of first type workers superior with respect to one work item and second type workers superior with respect to other work item, whereby the work efficiency of the group as a whole can be easily enhanced.

The instruction target person selecting means may select the instruction target person exhibiting a high degree of master with respect to the instruction item selected by the instruction item selecting means among the instruction target persons.

Therefore, the worker exhibiting the high degree of master can be selected and given the priority of the instruction with respect to the work item showing the low degree of master among the work items in one entire work group. It is therefore feasible to easily train the worker excellent with respect to the work item exhibiting the low degree of master as the work group, whereby the work efficiency of the group as a whole can be easily enhanced.

According to the present invention, an instruction support system comprises a first terminal and a second terminal connected to a communication line, wherein the first terminal includes a first storing means for storing attribute data of an instruction target person, an inputting means for inputting degree-of-master basic data of the instruction target person for every plurality of instruction items, and a first communication means for transmitting the data to a communication line, and the second terminal includes a second storing means for storing the attribute data of the instruction target person, a second communication means for receiving the data from the communication line, an instruction item evaluating means for evaluating a degree of master of the instruction target person to be evaluated with respect to every instruction item on the basis of the degree-of-master basic data received from the first terminal, a total degree-of-master evaluating means for evaluating a total degree of master of the instruction target person to be evaluated on the basis of the degree of master obtained by the instruction item evaluating means, and a capability rank judging means for judging which capability rank among a plurality of capability ranks defined by every predetermined range of degrees of master the instruction target comes under on the basis the total degree of master obtained by the total degree-of-master evaluating means.

Then, the instruction item may be a repair technique in repairing a vehicle.

Further, according to the present invention, there is provided a readable-by-computer medium stored with a program for making a computer comprising inputting means for inputting data and storing means for storing attribute data of each of instruction target persons of one instruction target group consisting of a plurality of instruction target persons, execute evaluating a degree of master of each instruction target person with respect to every plurality of instruction items, calculating an overall evaluation of one instruction target group with respect to the instruction item concerned on the basis of the degree of master that is evaluated and obtained with respect to every instruction item, selecting the instruction item exhibiting a low degree of master by comparing the calculated overall evaluations of the respective instruction items with each other, and selecting which instruction target person who should be instructed with respect to the selected instruction item exhibiting the low degree of master.

Herein, each of the instruction item evaluating means, the instruction item overall evaluating means, the instruction item selecting means, instruction target person selecting means, the total degree-of-master evaluating means and the capability rank judging means, corresponds to a CPU (Central Processing Unit) and so on. Further, the storing means corresponds to a hard disk and so on, and the inputting means corresponds to a mouse, a keyboard and so forth.

Further, a display means for displaying characters and image data may be added to the instruction support system of the present invention. A CRT (Cathode Ray Tube) and a liquid crystal display may be exemplified as the display means.

According to the present invention, it is possible to provide the instruction support system capable of efficiently enhancing a work efficiency of one work group consisting of a plurality of workers.

Further, according to the present invention, it is feasible to provide the instruction support system enabling the comparatively short-experienced worker to repair the vehicle in a short period of time in a way that keeps a preferable quality.

BEST MODE FOR CARRYING OUT THE INVENTION

An embodiment of the present invention will hereinafter be described with reference to FIGS. 1 through 18.

Figure 1:
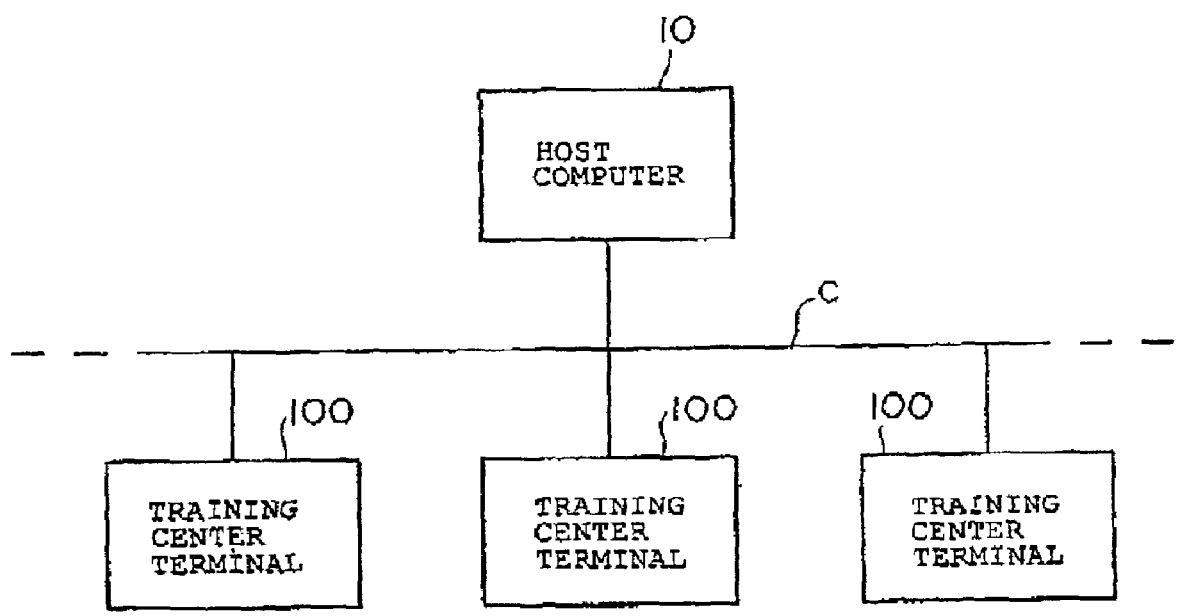
FIG. 1 is a diagram showing a whole architecture of a CAI (Computer Aided Instruction) system in one embodiment of the present invention.

FIG. 1 is a diagram showing an architecture of a whole computer aided instruction (CAI) system in the embodiment of the present invention. The present CAI system is configured by a head-office host computer 10 and a plurality of training center terminals 100 connected via a communication line C to the host computer 10.

Referring to FIG. 1, each of the host computer 10 and the plurality of training center terminals 100 is a personal computer or the like.

Figure 2:
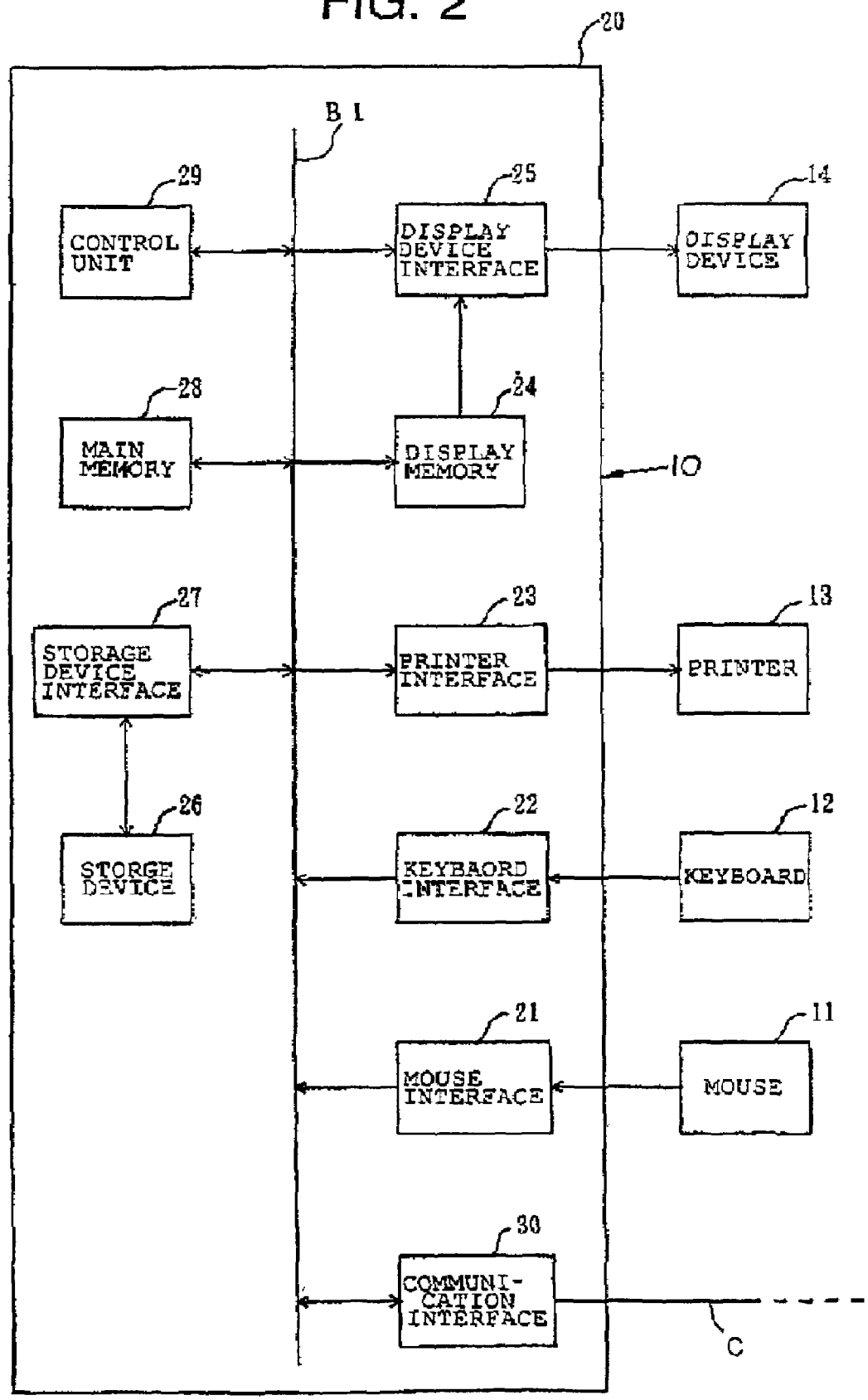
FIG. 2 is a diagram showing an architecture of a host-computer-sided terminal in the embodiment.

FIG. 2 shows an architecture of the host computer 10. The host computer 10 is constructed of a mouse 11, a keyboard 12, a printer 13, a display device 14 and a computer main unit 20.

Further, the computer main unit 20 includes a mouse interface 21, a keyboard interface 22, a display memory 24, a display device interface 25, a storage device interface 27, a main memory 28, a control unit 29 and a communication interface 30, which are all connected to each other via a bus B1, and a storage device 26 connected via the storage device interface 27 to the bus B1. Moreover, the mouse 11 is connected to the bus 51 via the mouse interface 21, and the keyboard 12 is connected to the bus B1 via the keyboard interface 22. Further, the printer 13 is connected to the bus B1 via the printer interface 23, and the display device 14 is connected to the bus B1 via the display device interface 25.

The mouse 11 and the keyboard 12 are device, for an operator who maintains and manages the host computer 10 to input the data. The mouse 11 and the keyboard 12 correspond to input means.

The display device 14 is a device for displaying characters inputted from the keyboard 12 and the data read from the storage device 26. Moreover, the printer 13 is a device for printing the data etc displayed on the display device 14.

Then, the computer main unit 20 is a unit for executing a program.

The mouse interface 21 is a device for receiving and transferring the data inputted from the operator to the bus B1 through the mouse 11. Further, the keyboard interface 22 is a device for receiving and transferring the data inputted from the operator to the bus B1 through the keyboard 12.

Further, the display memory 24 is constructed of a RAM (Random Access Memory) and so on. The display memory 24 is a memory for retaining the character data, the image data and so on that are displayed on the display device 14. Then, the display device interface 25 is a device for displaying the character data, the image data etc on the display device 14.

The storage device 26 is a hard disk device for storing the program processed by a control unit 29 and attribute data etc of instruction target persons (training participants). This storage device 26 corresponds to a first storage means.

Herein, the attribute data about the training participant include a participation number, a name of the participant, a data of participant's birth, a company code of the participant, an in-office working section, a training course, a rank of capability and so forth.

The storage device interface 27 is a device for writing and reading the data to and from the storage device 26.

The main memory 28 is a memory constructed of a RAM etc and is used for an operation of the control unit 29.

The communication interface 30 is a device for transmitting to the communication line C the data received from the bus B1 and transmitting to the bus B1 the data received from the communication line C. Note that the communication interface 30 corresponds to a first communication means.

The printer interface 23 is a device for receiving the data from the bus B1 and transmitting the data to the printer 13.

The control unit 29 constructed of a CPU or the like writes the character data, the image data and so forth to the display memory 24, and gives a screen display indication to the display device interface 25. Further, the control unit 29 indicates the storage device interface 27 to write and read the data to and from the storage device 26.

Moreover, the control unit 29 receives the input data from the mouse 11 through the mouse interface 21, and receives the input data from the keyboard 12 via the keyboard interface 22. Further, the control unit 29 receives the data from the communication line C via the communication interface 30 and transmits the data to the communication line C via the communication interface 30. Moreover, the control unit 29 processes the character data etc inputted through the mouse 11 and the keyboard 12 and also the screen data that are displayed on the display device 14. This control unit 29 corresponds to an instruction item evaluating means, an instruction item general evaluating means, an instruction item selection means, an instruction target person selection means, a total mastering degree evaluating means and a rank-of-capability judging means.

Figure 3:
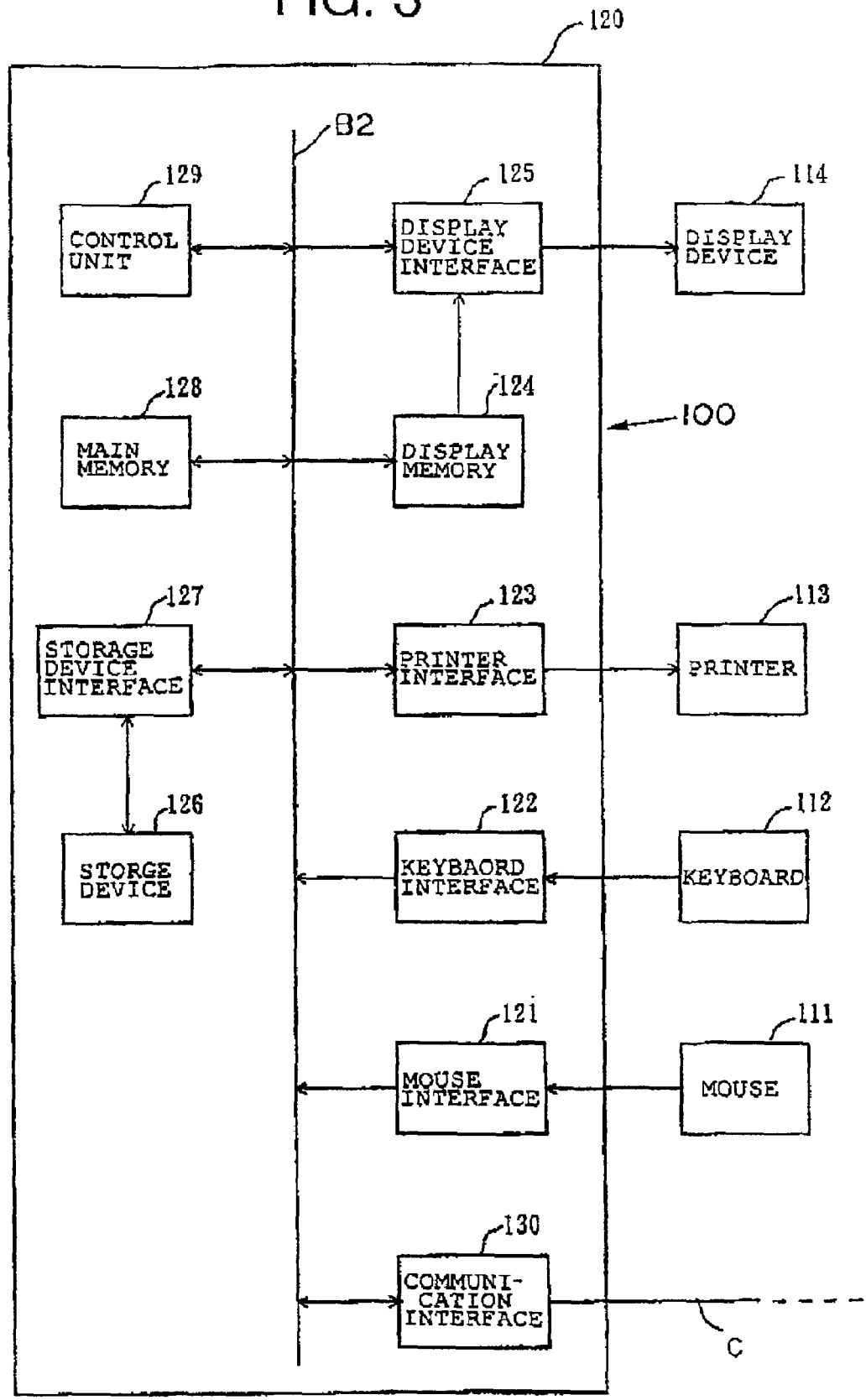
FIG. 3 is a diagram showing an architecture of a training-center-sided terminal in the embodiment.
Figure 4:
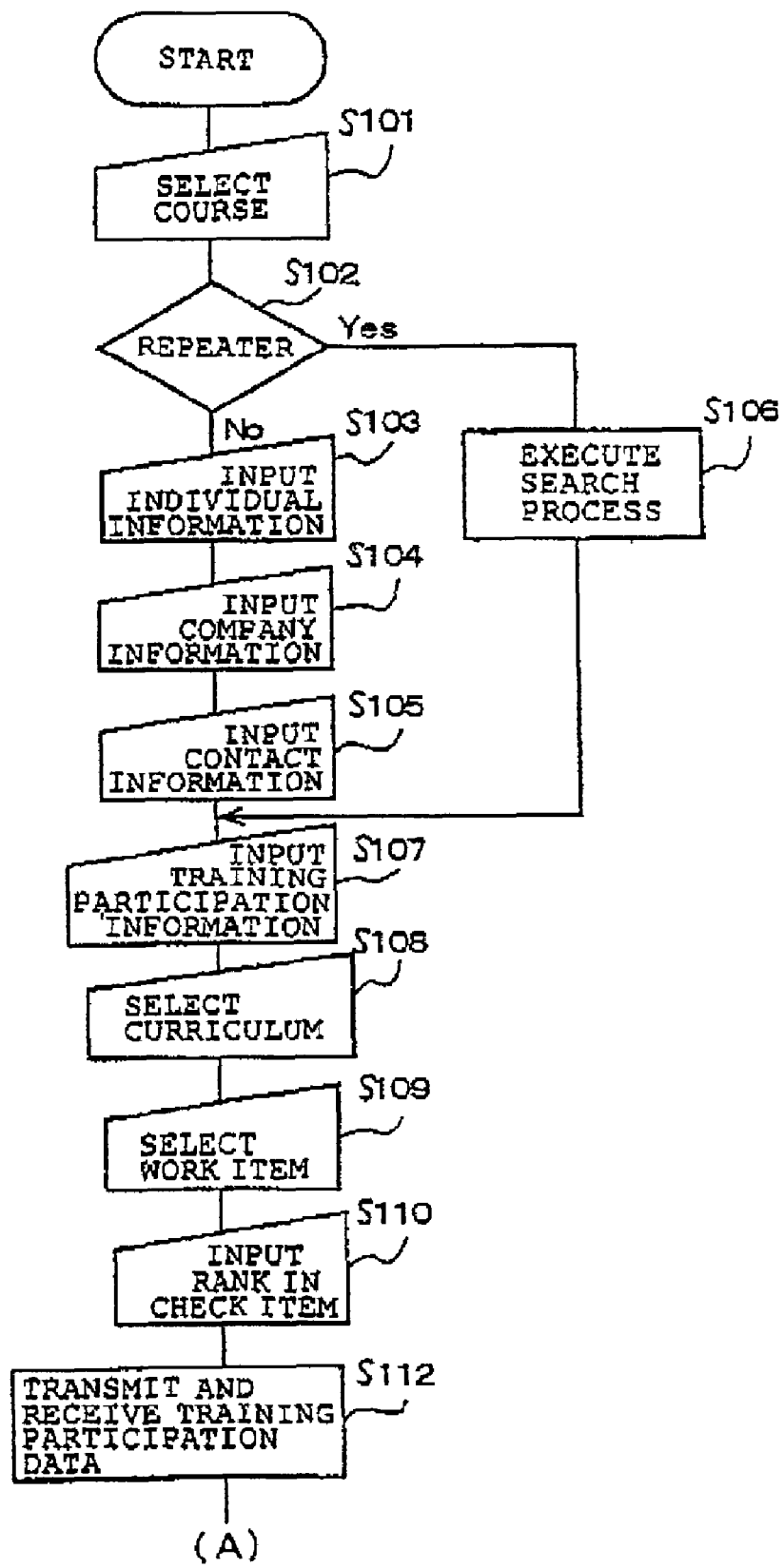
FIG. 4 is a flowchart showing a control process executed by a control unit in the embodiment.
Figure 5:
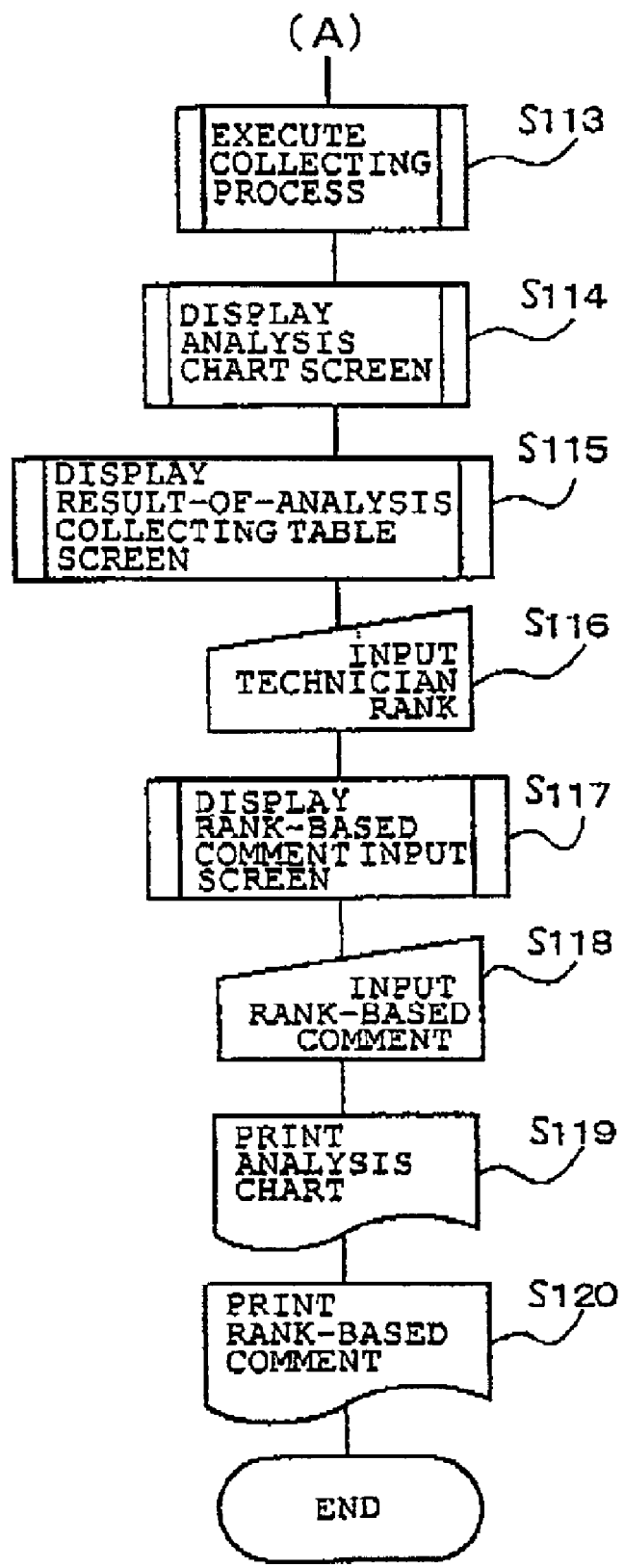
FIG. 5 is a flowchart showing the control process executed by the control unit in the embodiment.

Next, the training center terminal 100 will be explained referring to FIG. 3. The training center terminal 100 includes a mouse 111, a keyboard 112, a printer 113, a display device 114 and a computer unit 120.

Further, the computer main unit 120 includes a mouse interface 121, a keyboard interface 122, a display memory 124, a display device interface 125, a storage device interface 127, a main memory 128, a control unit 129 and a communication interface 130, which are all connected to each other via a bus B2, and a storage device 126 connected via the storage device interface 127 to the bus B2. Moreover, the mouse 111 is connected to the bus B2 via the mouse interface 121, and the keyboard 112 is connected to the bus B2 via the keyboard interface 122. Further, the printer 113 is connected to the bus B2 via the printer interface 123, and the display device 114 is connected to the bus B2 via the display device interface 25.

The mouse 111 and the keyboard 112 are devices for an operator who maintains and manages the training center terminal 100 to input the data. The mouse 111 and the keyboard 112 correspond to input means.

The display device 114 is a device for displaying characters inputted from the keyboard 112 and the data read from the storage device 126. Moreover, the printer 113 is a device for printing the data etc displayed on the display device 114.

Then, the computer main unit 120 is a unit for executing a program.

The mouse interface 121 is a device for receiving and transferring the data inputted from the operator to the bus B2 through the mouse 111. Further, the keyboard interface 122 is a device for receiving and transferring the data inputted from the operator to the bus B2 through the keyboard 112.

Further, the display memory 124 is constructed of a RAM (Random Access Memory) and so on. The display memory 124 is a memory for retaining the character data, the image data and so on that are displayed on the display device 114. Then, the display device interface 125 is a device for displaying the character data, the image data etc on the display device 114.

The storage device 126 is a hard disk device for storing the program processed by a control unit 129 and attribute data eta of instruction target persons (training participants). This storage device 126 corresponds to a second storage means.

Herein, the attribute data about the training participant include a participation number, a name of the participant, a date of participant a birth, a company code of the participant, an in-office working section, a training course, a rank of capability and so forth, which are the same as the data stored in the storage device 26 provided in the head office.

The storage device interface 127 is a device for writing and reading the data to and from the storage device 126.

The main memory 128 is a memory constructed of a RAM etc and is used for an operation of the control unit 129.

The communication interface 130 is a device for transmitting to the communication line C the data received from the bus B2 and transmitting to the bus B2 the data received from the communication line C. Note that the communication interface 130 corresponds to a second communication means.

The printer interface 123 is a device for receiving the data from the bus B2 and transmitting the data to the printer 113.

The control unit 129 constructed of a CPU or the like writes the character data, the image date and so forth to the display memory 124, and gives a screen display indication to the display device interface 125. Further, the control unit 129 indicates the storage,device interface 127 to write and read the data to and from the storage device 126.

Moreover, the control unit 129 receives the input data from the mouse 111 through the mouse interface 121, and receives the input data from the keyboard 112 via the keyboard interface 122. Further, the control unit 129 receives the data from the communication line C via the communication interface 130 and transmits the data to the communication line C via the communication interface 130. Moreover, the control unit 129 processes the character data etc inputted through the mouse 111 and the keyboard 112 and also the screen data that are displayed on the display device 114.

Next, details of the control actualized by the control unit 29 of the host computer 100 that executes the program stored in the storage device 26 and by the control unit 129 of the training center terminal 100 that executes the program stored in the storage device 126, will be explained together with operating steps of the operator with reference to flowcharts in FIGS. 4 through 17.

The discussion will be focused at first on processing about the individual training participant referring mainly to FIGS. 4 through 16 and subsequently on processing about a group of the training participants.

Note that this embodiment deals with the instruction system for the vehicle repair workers. Then, the instruction given in the training center involve a plurality of training courses corresponding to technical levels of the participants, and categories of knowledge and techniques that should be acquired.

To begin with, a training course is selected on the training center terminal 100 (step 101), and it is judged whether the training participant is a repeater (step 102). If the training participant is a participant for the first time, there are inputted individual information of the participant, information of the company for which the participant works and further contact information of the participant (steps 103–105). Then, the processing proceeds to step 107, Note that if the training participant is judged to be the repeater in step 102, a search process is executed in step 106, and, after various items of information on the participant concerned are read from the storage device 126, the processing proceeds to step 107.

Then, a participation number, a date of participation, a training school and a name of the instructor who instructs the training participant, are inputted in step 107. Further, a curriculum (training plan established by subitemizing each of the instruction items in the training course) that should be received, is selected in step 108. Note that the instruction items set in one curriculum in, e.g., a toning/coating training course are basic coating knowledge (study on coating material and coating film, an coating and drying), a spray gun (study on names and functions of respective components, an operation of the spray gun, and a variety of adjustments), preparatory operations (training about degreasing/leg welding and masking), solid toning/coating (training about how to see and check the toning data, toning, a hardening material and a thinner, over-coating, drying and polishing), and metallic/2-coat pearl toning/coating (toning, over-coating, fluorine clear coating, and scratch-proof clear coating), and a basic mastering time is set for each training item.

Thereafter, the participant receives the training, and, next in step 109, an operation item for a technical check for grasping how much the training participant masters the technique. Note that the operating items set as, e.g., sheet metal working techniques are a judgement about a damage to a panel, attaching/detaching technique, a panel roughening technique, a panel drawing technique, a panel figuring technique and so on. Then, a rank input of the check item is done with respect to the operating item selected in step 109 (step 110). Herein, the rank input of the check item intends, if the operating item is, e.g., the attaching/detaching technique, to check a degree of master at four stages A–D with respect to each of the check items such as a judgement about the attaching/detaching procedure depending on a vehicle structure, attaching/detaching of bonding type ports, attaching/detaching of bolts and clips, selecting a tool to be used and so forth. The input data correspond to degree-of-master basic data.

Next, the training center terminal 100 transmits and receives the training data containing the degree-of-master basic data inputted in step 110 to and from the head-office host computer 10 via the communication line (step 112).

Then, in step 113 (FIG. 5), the control unit 29 of the host computer 10 executes a collecting process. The details of this process will however, be explained referring to a flowchart in FIG. 8. Namely, a maximum score acquiring process (that will be described in depth referring to a flowchart in FIG. 9) is executed in step 301. Uncollected pieces of training participant data are obtained in step 302. Then, if the training participants are left, a collecting main process (its details will be explained referring to flowcharts in FIGS. 10–12) is executed, and the processing comes to an end just when the final training participant is reached (steps 303, 304).

Figure 9:
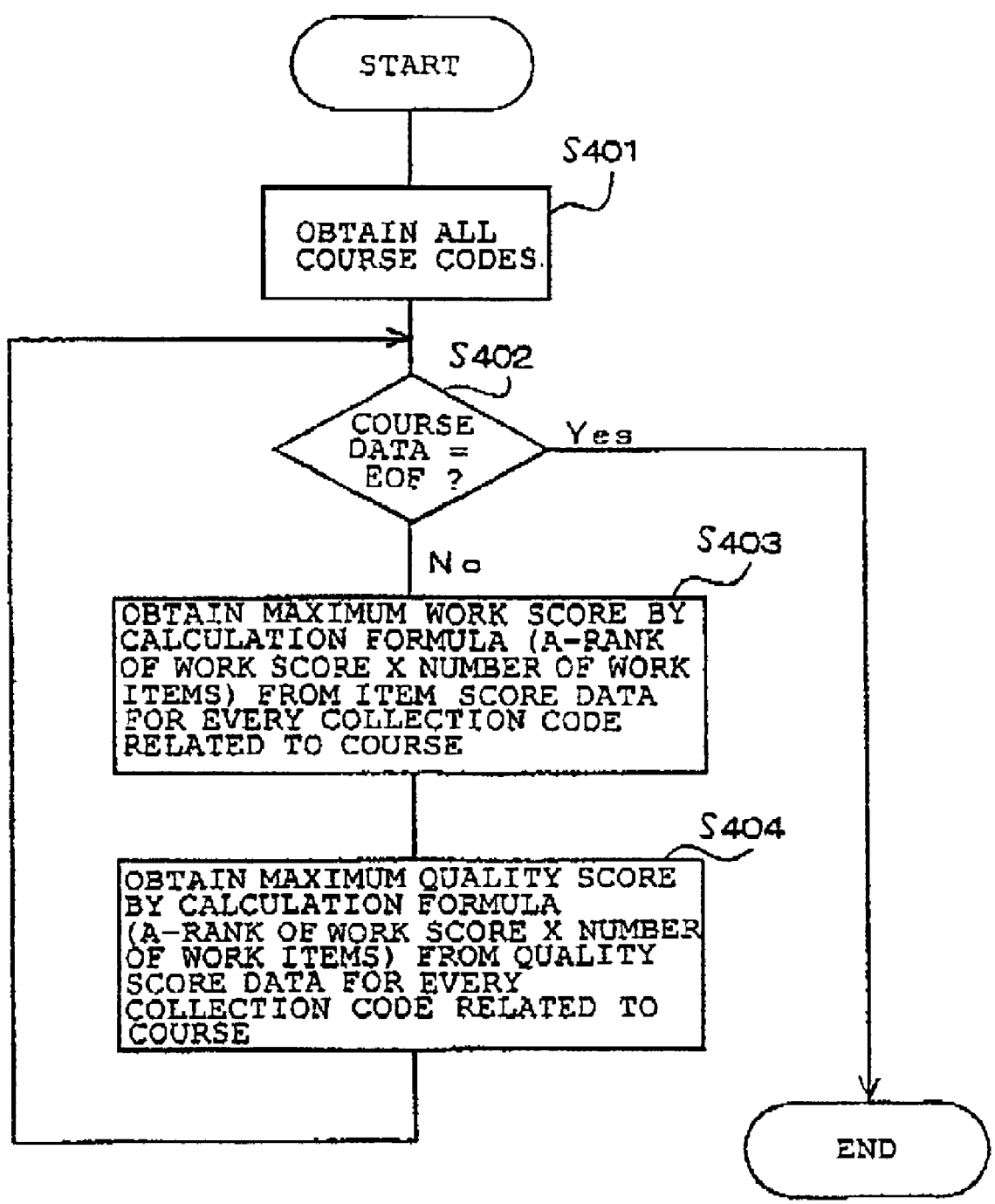
FIG. 9 is a flowchart showing the control process executed by the control unit in the embodiment.

Herein, the detailed process in step 301 will be described with reference to FIG. 9, To be specific, the control unit 29 obtains all the course codes from the storage device 26 (step 401). Then, the control unit 29 reads the course data corresponding to the obtained course code, and obtains a maximum operation score from item count data by [multiplying a rank A of the operation score by the number of operation items] for every collection code related to the course with the course data (steps 402, 403). Further, the control unit 29 obtains a maximum quality score from the item count data by [multiplying a rank A of the quality score by the number of quality items] for every collection code related to the course (step 404). Note that if the processing of all the course data is finished in step 402 in FIG. 9, the processing moves to step 302 in FIG. 8.

Figure 10:
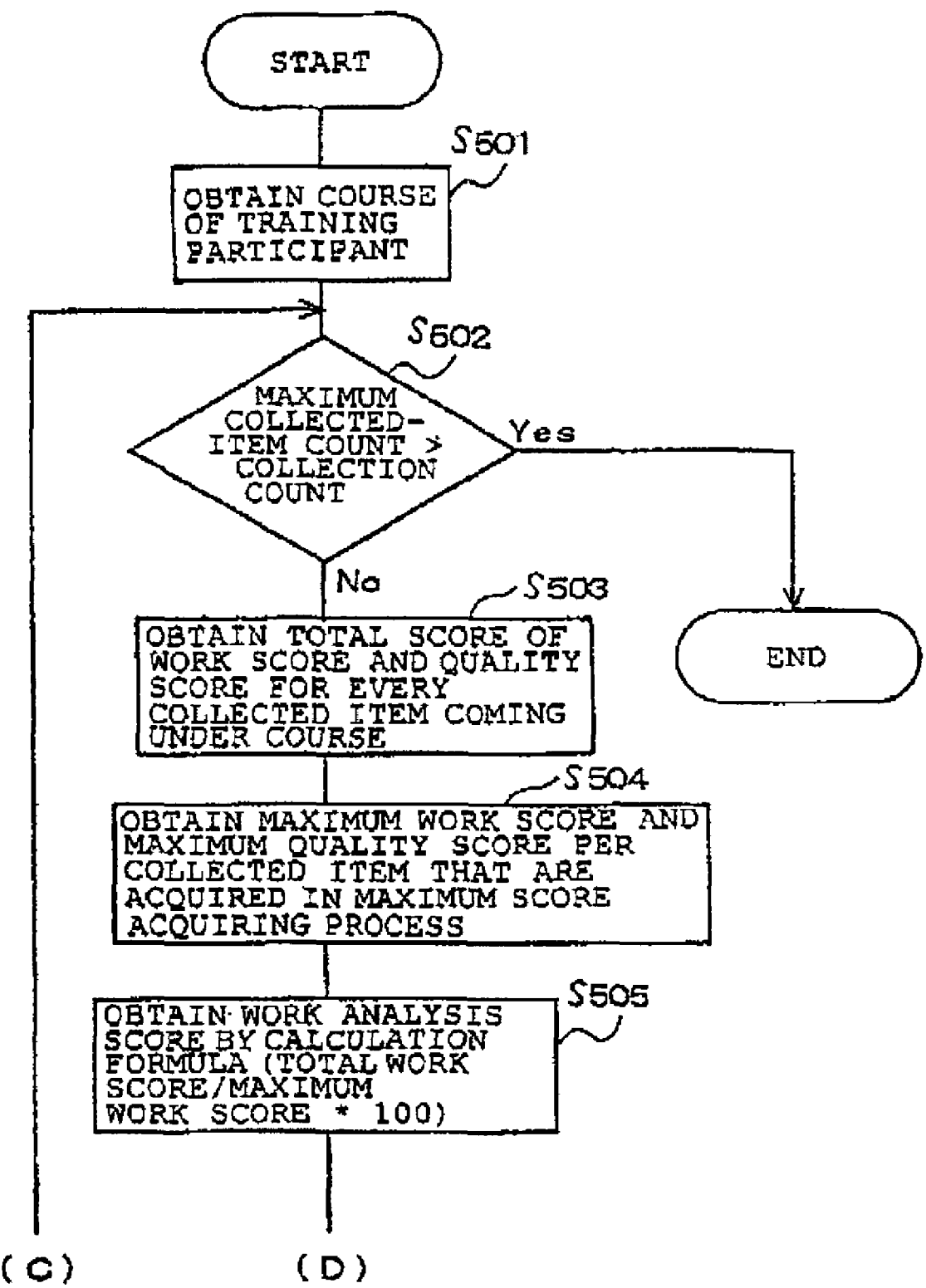
FIG. 10 is a flowchart showing the control process executed by the control unit in the embodiment.
Figure 11:
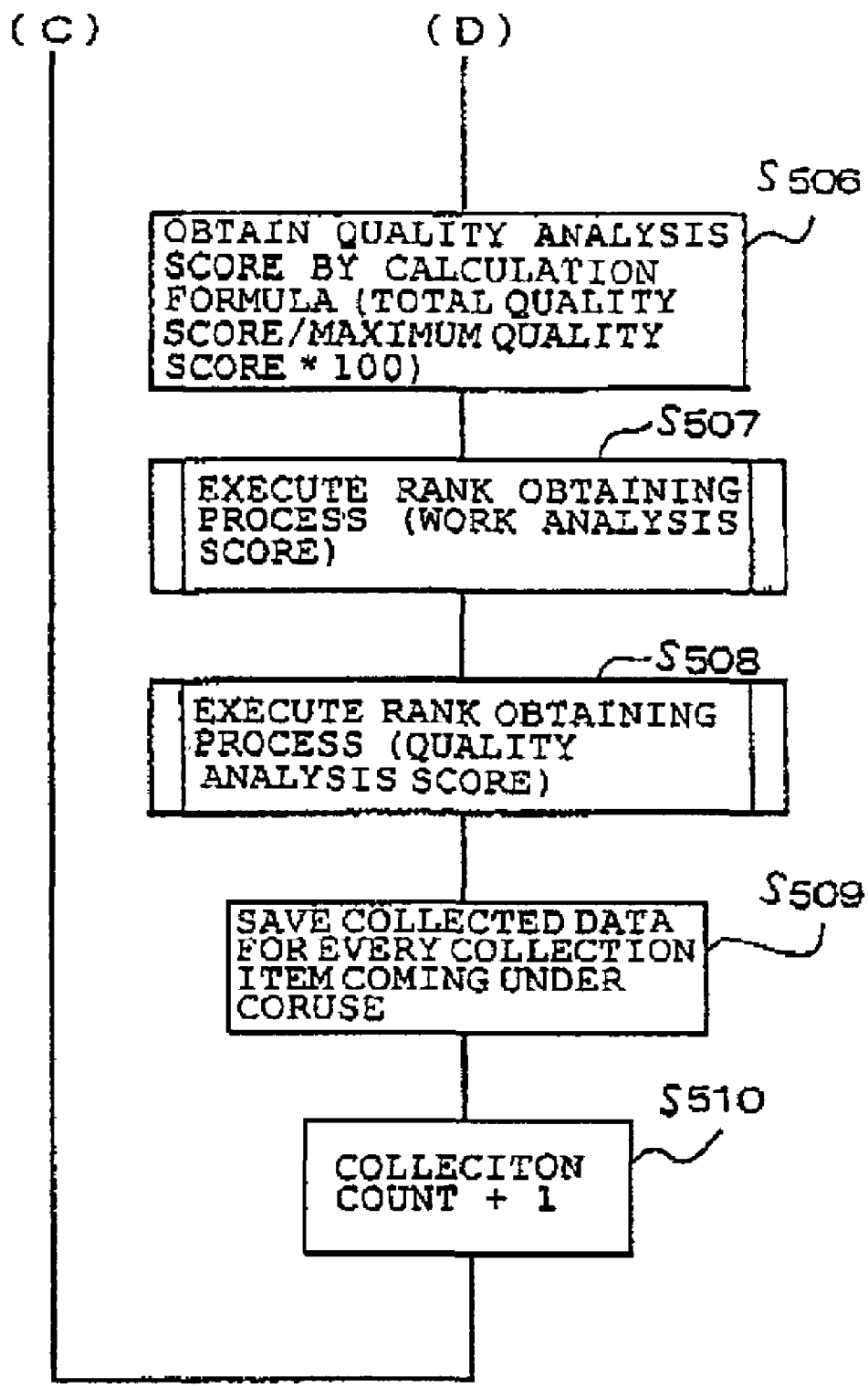
FIG. 11 is a flowchart showing the control process executed by the control unit in the embodiment.

Next, a process in step 304 will be described in depth referring to FIGS. 10 through 12. Namely, the control unit 29 obtains (a category) of the course received by the training participant (step 501), and judges whether a maximum collected-item count is larger than a collection count (step 502). If judged to be negative in step 502, the control unit 29 obtains a total sum of the operation score and the quality score for every collection item coming under the course (step 603). Then, the control unit 29 obtains a maximum operation score and a maximum quality score for every collection item that have been acquired in the maximum score acquiring process (step 504). Further, the control unit 29 multiplies by 100 a value obtained by dividing the total operation score by the maximum operation score, thereby obtaining an operation analysis score (step 505). Then, the control unit 29 multiplies by 100 a value obtained by dividing the total quality score by the maximum quality score, thereby obtaining a quality analysis score (step 506).

Then, the control unit 29 executes a rank acquiring process is executed by use of the operation analysis score (step 507), and also executes a rank process by use of the quality analysis score (step 508). Moreover, the control unit 29 stores the storage device 26 with the collected pieces of data for every collection item coming under the course (step 509), and increments the collection count by [1] (step 510). Then, the processing loops back to step 502.

Figure 12:
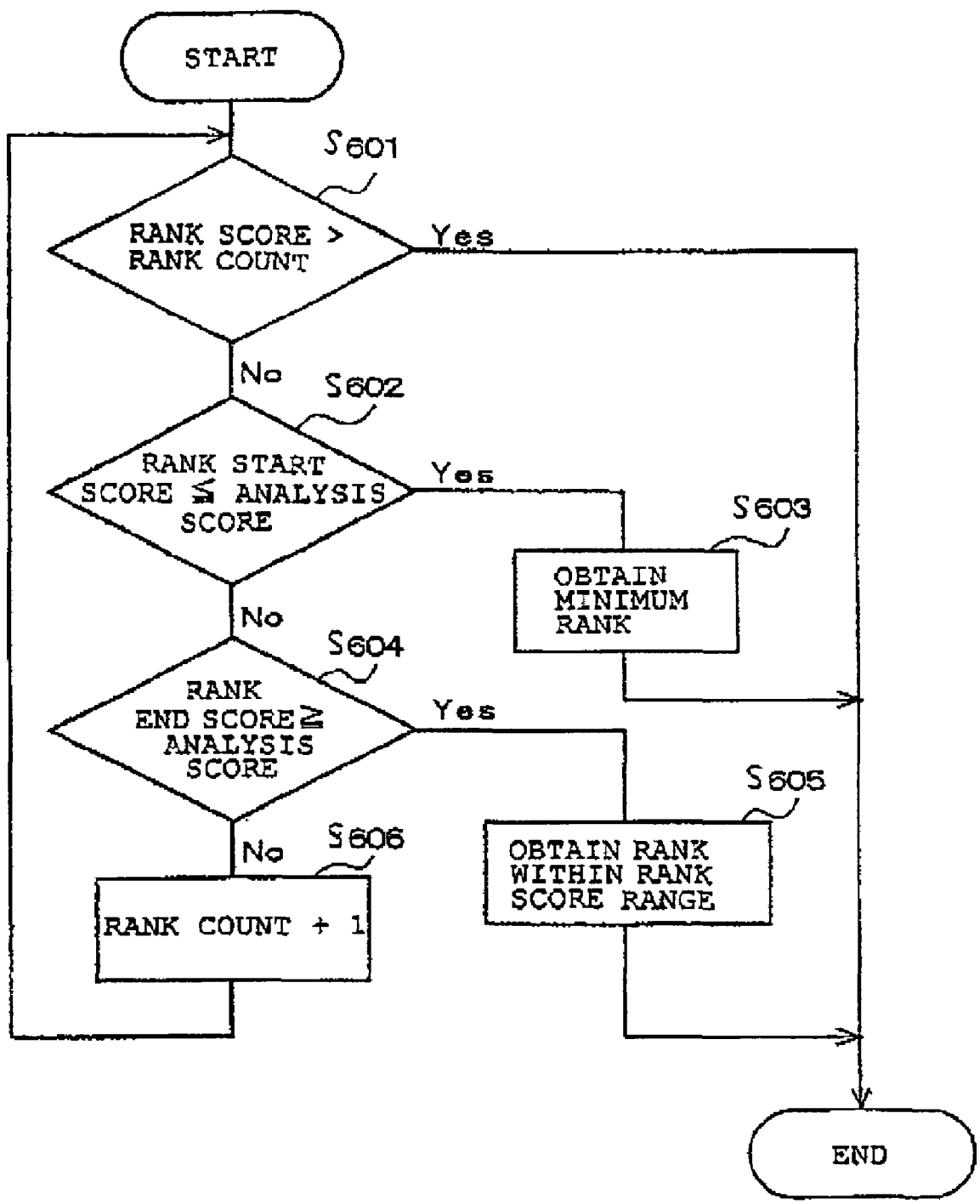
FIG. 12 is a flowchart showing the control process executed by the control unit in the embodiment.

Note that FIG. 12 shows the detailed processes in steps 507 and 508. Namely, the control unit 29 judges in step 601 whether the rank score is greater than the rank count. If greater than the rank count the processing herein is finished (the processing moves to step 560 or 509) Whereas if smaller than the rank count, the processing proceeds to step 602, wherein the control unit 29 judges whether a rank start score is equal to or smaller than a analysis score. If judged to be affirmative in step 602, a minimum rank is acquired in step 603, and the processing heroin comes to an end. If judged to be negative in step 602, the control unit judges in step 604 whether a rank end score is equal to or smaller then the analysis score. Then, if Judged to be affirmative in step 604, the control unit 29 obtains a rank within a rank score range, and the processing herein is finished. If judged to be negative in step 604, the rank count is incremented by [1], and the processing loops back to step 601.

Figure 13:
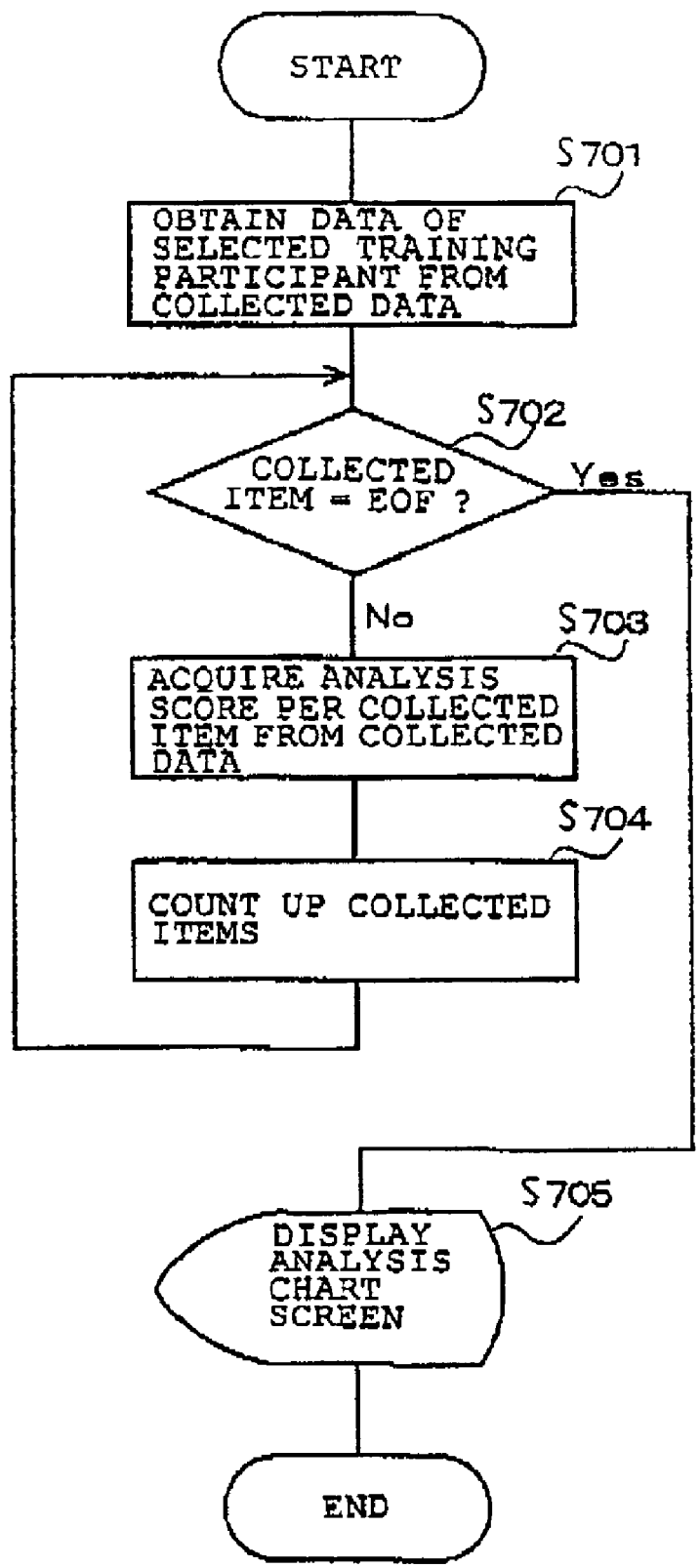
FIG. 13 is a flowchart showing the control process executed by the control unit in the embodiment.

The control unit 29, after thus executing the collecting process in step 113, displays an analysis chart screen (see FIG. 18) in step 114. FIG. 13 fully shows the process in step 114. Namely, as shown in FIG. 13, the control unit 29 obtains the data of the selected training participant from the collected data (step 701), and judges whether all the processes for the collection items are finished (step 702). If judged to be negative in step 702, the control unit 29 obtains the analysis score for every collection item from the collected data (step 703) and counts up the collection items (step 704), and the processing loops back to step 702. Further, if judged to be affirmative in step 702, the analysis chart screen is displayed on the display device 14 (step 705), and the processing herein comes to an end (the processing moves to step 115).

Figure 14:
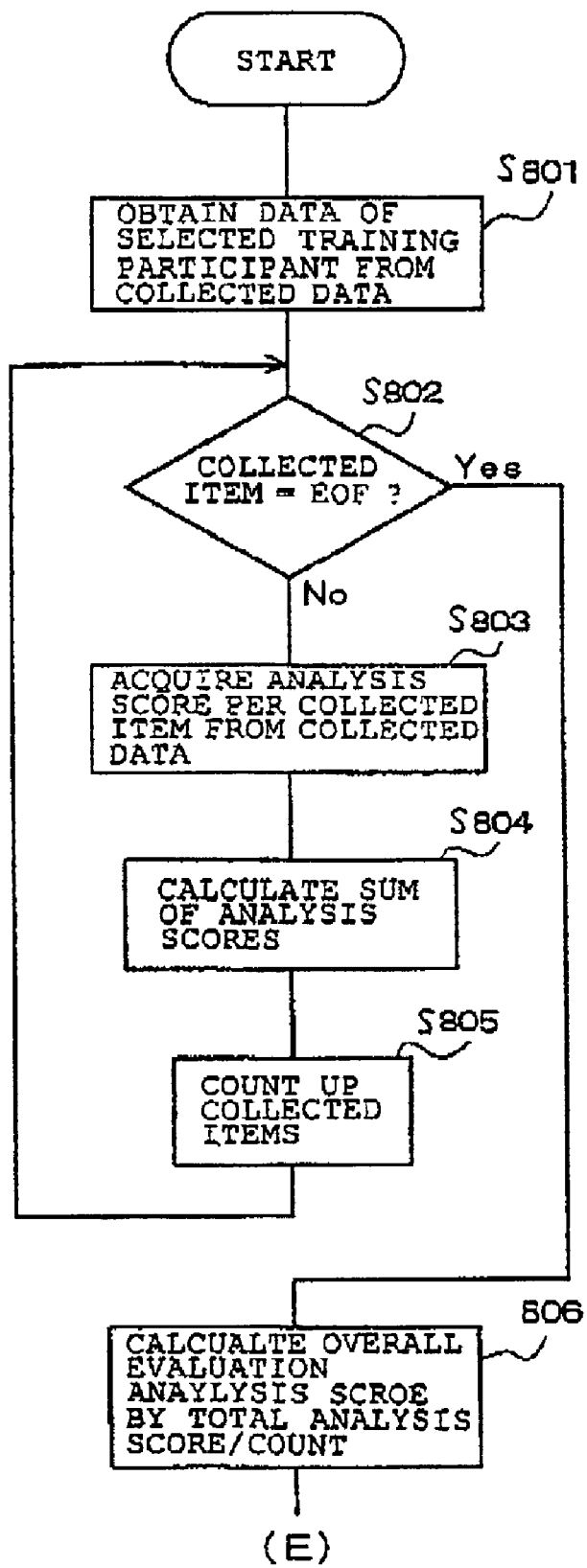
FIG. 14 is a flowchart showing the control process executed by the An control unit in the embodiment.
Figure 15:
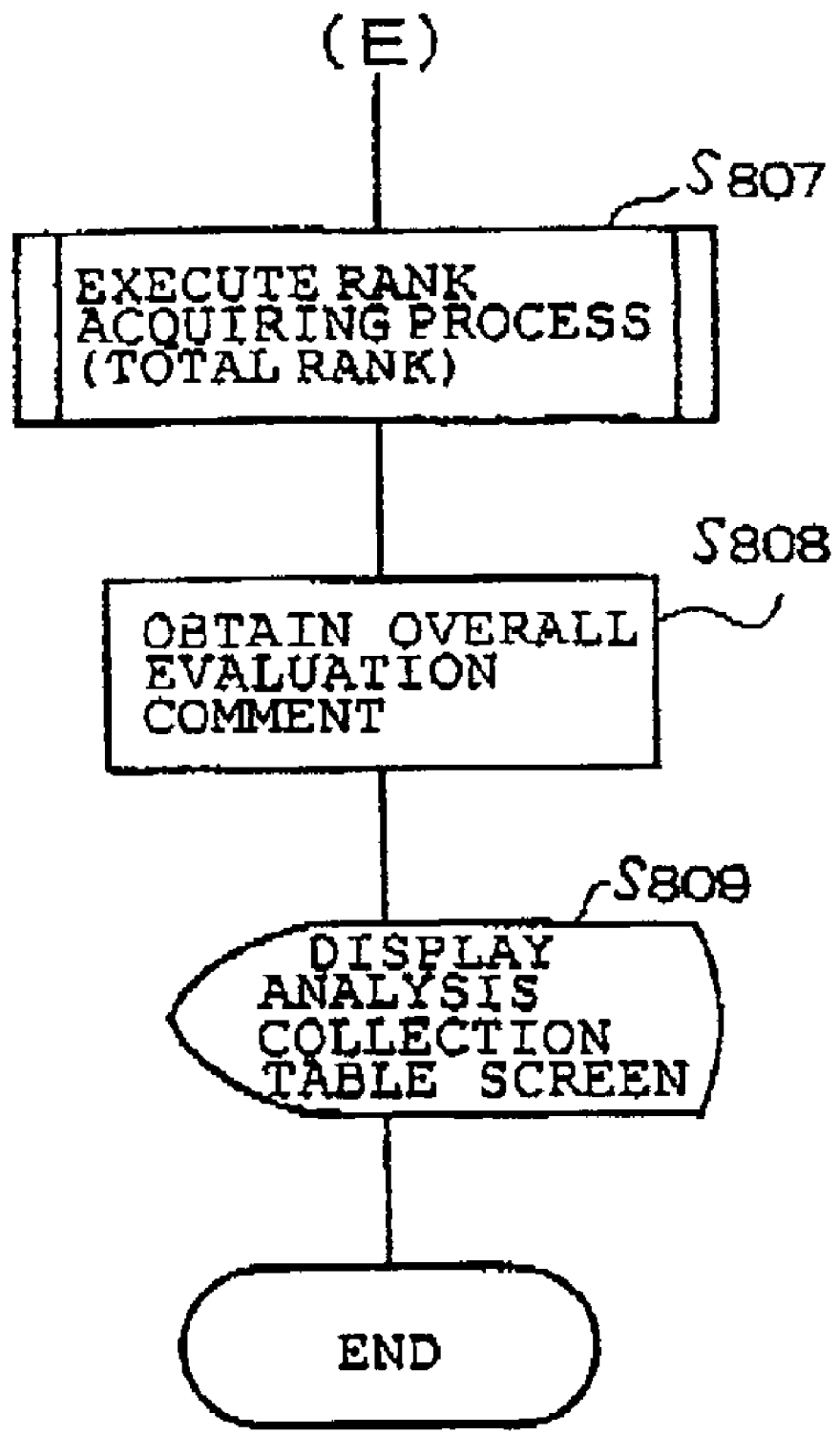
FIG. 15 is a flowchart showing the control process executed by the control unit in the embodiment.

FIGS. 14 and 15 show the process in step 115 in details. Then, in step 115 shown in details in FIGS. 14 and 15, the control unit 29 at first in step 801 obtains the selected training participant data from the collected data, and judges whether all the processes for the collection items are finished (step 802). If judged to be negative in step 802, the control unit 29 obtains the analysis score for every collection item (step 803), then calculates a sum of the analysis is scores (step 804), and counts up the collection items (step 805), and the processing loops back to step 802. If judged to be affirmative in step 802, the control unit 29 calculates a total evaluation analysis score by diving the sum of the analysis scores by a count value in step 806, and executes a rank acquiring process of the total rank in step 807 (step 807). Then, the control unit 29 obtains a general evaluation comment (step 808) and displays an analysis collection screen on the display device 14 (step 809), and the processing herein is finished (the processing moves to step 116). Note that the same processes as those given in the flowchart shown in FIG. 12 are executed in the rank acquiring process in step 807, thereby obtaining the total rank.

Next, the control unit 29 permits inputting a technician rank corresponding to the total evaluation in step 116. Note that the technician ranks such as a first class technician, a second class technician and so on are set beforehand in the storage device 26 for every total evaluation value within a predetermined range.

Figure 16:
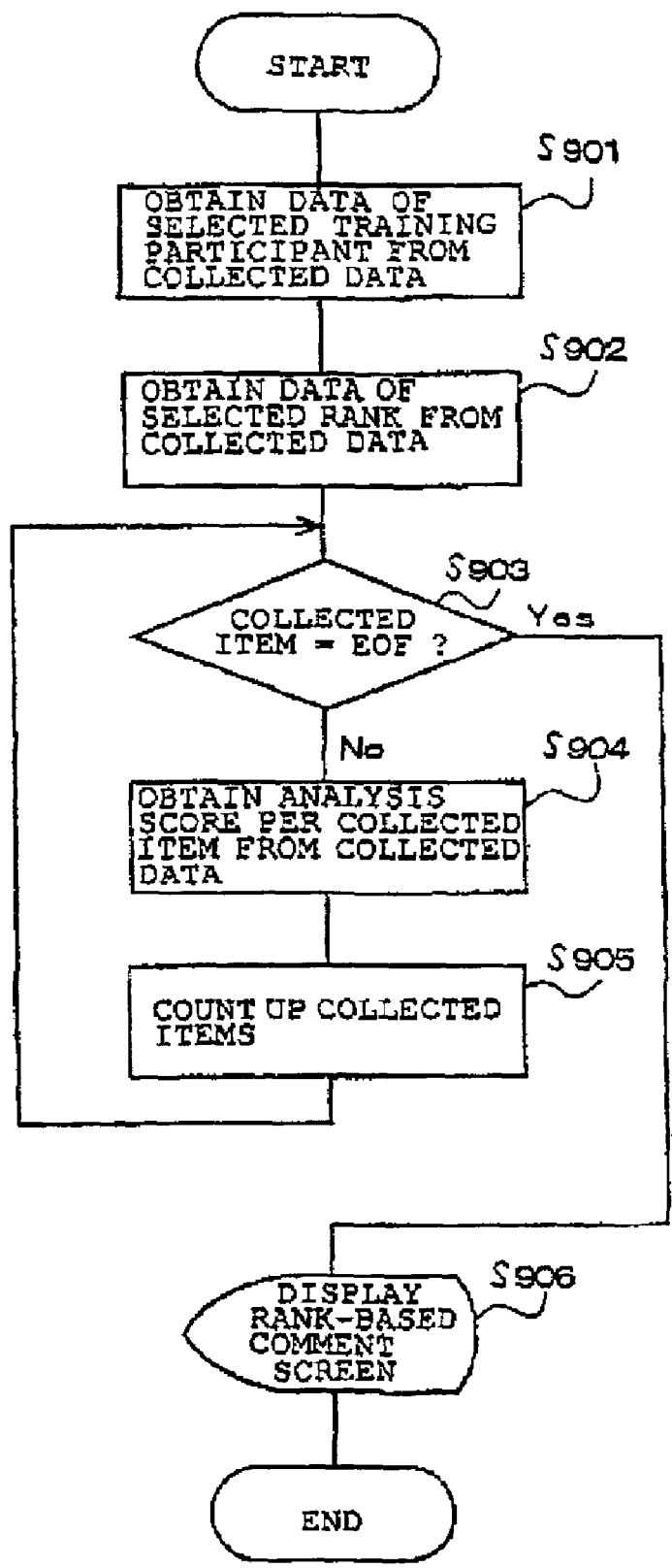
FIG. 16 is a flowchart showing the control process executed by the control unit in the embodiment.
Figure 17:
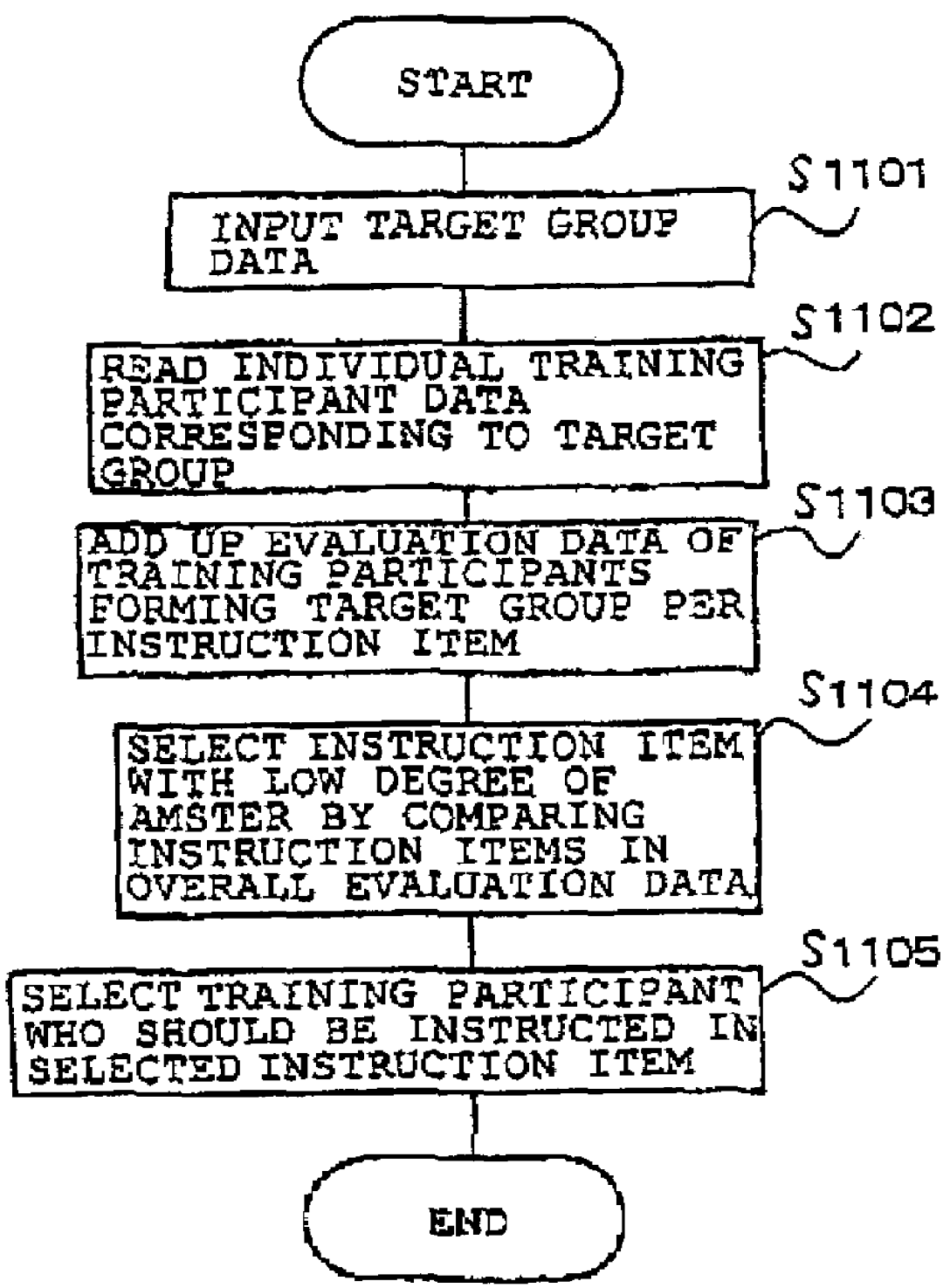
FIG. 17 is a flowchart showing the control process executed by the control unit in the embodiment.
Figure 18:
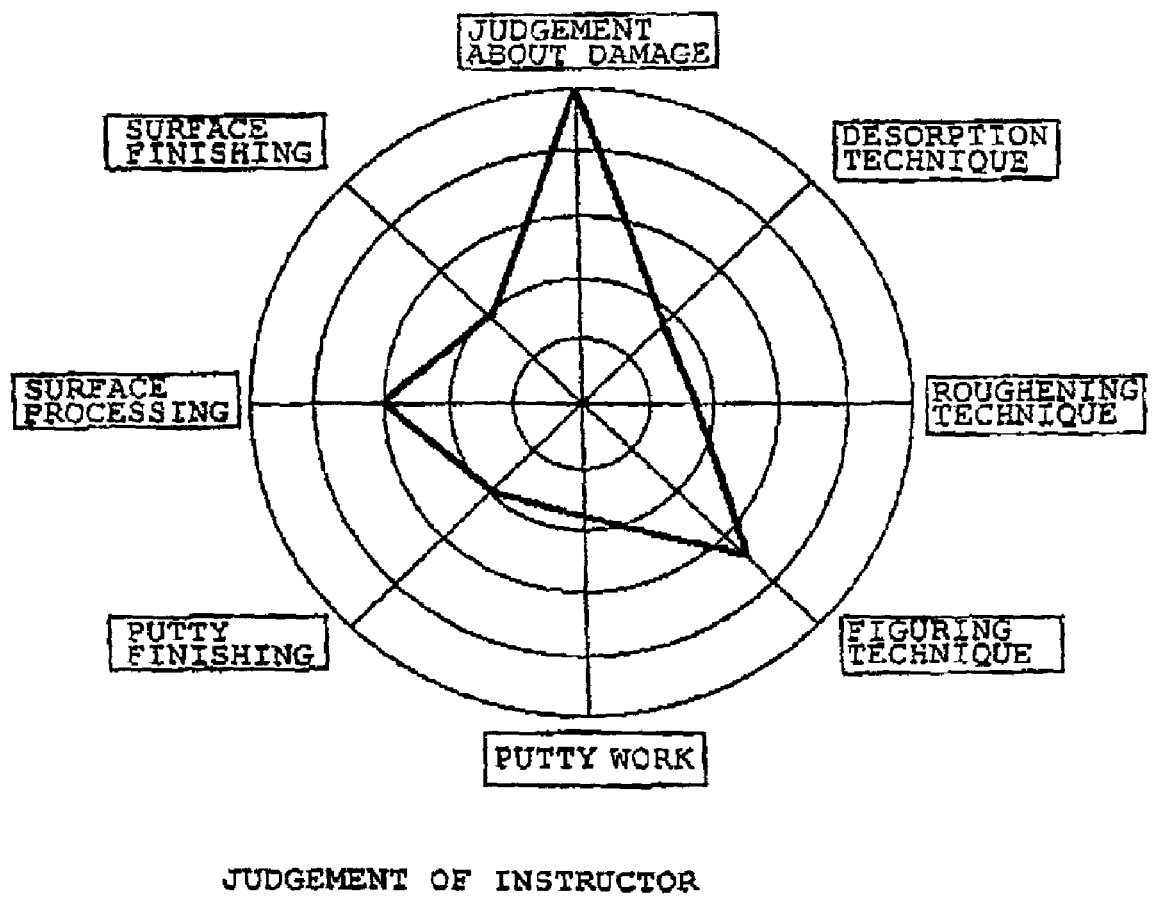
FIG. 18 is a pie chart showing a analysis of a degree of master with respect to every collection item in predetermined instruction items of a training participants which is calculated by the control unit in the embodiment.

FIG. 16 shows the process in step 117 in details. Further, in step 117 as shown in FIG. 16, the control unit 29 obtains the selected training participant data from the collected data (step 901). Moreover, the control unit 29 obtains the selected rank data from the collected data (step 902). Then, the control unit 29 judges in step 903 whether the processes for all the collection items are finished. If Judged to be negative in step 903, the control unit 29 obtains the analysis score for every collection item (step 904) and counts up the collection items (step 905), and the processing loops back to step 903. Further, if judged to be affirmative in step 903, the control unit 29 displays a rank-by-rank comment screen (step 906), and the processing herein comes to an end (the processing moves to step 116).

In step 118, the control unit 29 permits inputting a rank-by-rank comment and prints an analysis chart by the printer 13 (step 119) and prints the rank-by-rank comments as well (step 120), and the processing is finished. Note that the control unit 29 transmits the data that are printed in steps 119 and 120 to the training center terminal 100 via the communication line C from the host computer 10, and the control unit 129 of the training center terminal 100 is capable of printing the analysis chart and the rank-by-rank comments on the side of the training center terminal 100.

Figure 6:
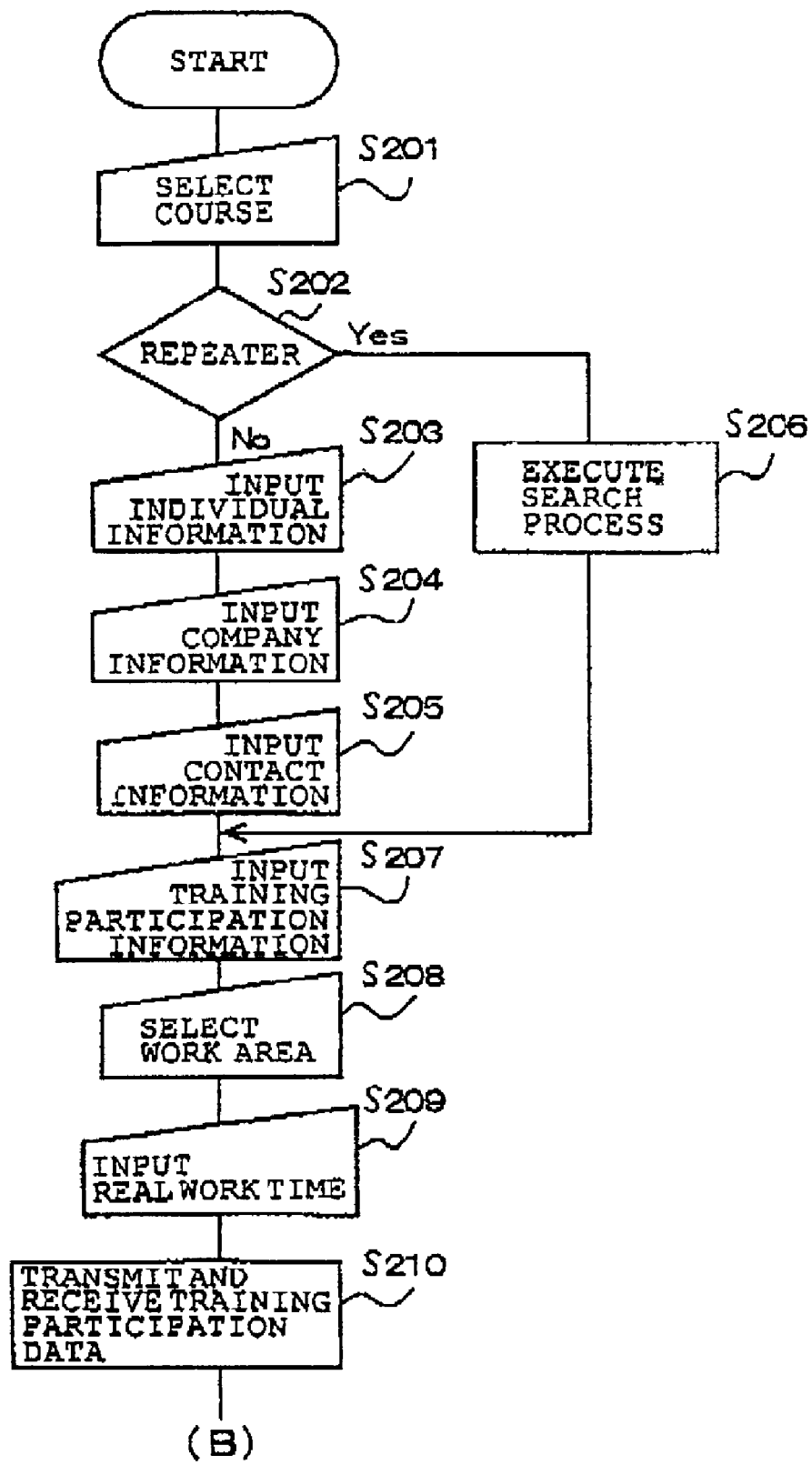
FIG. 6 is a flowchart showing the control process executed by the control unit in the embodiment.
Figure 7:
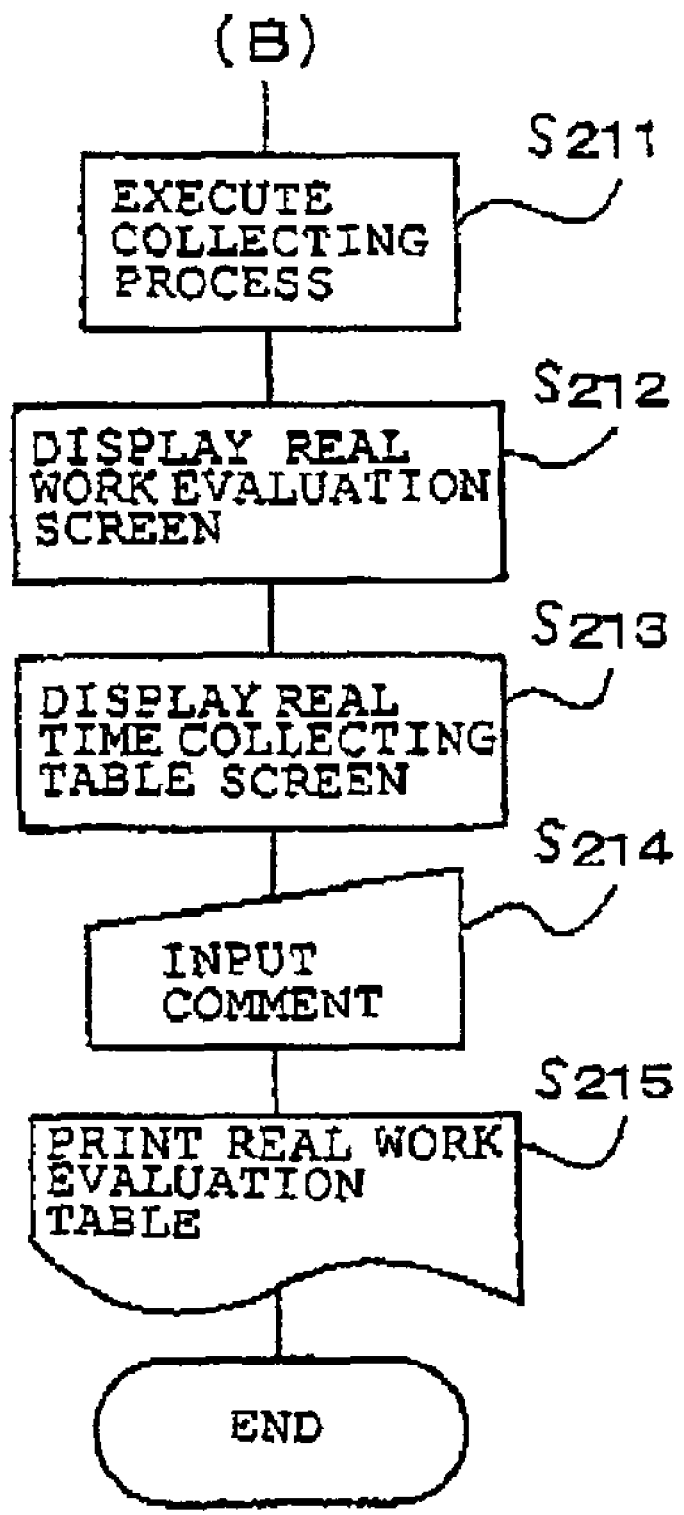
FIG. 7 is a flowchart showing the control process executed by the control unit in the embodiment.
Figure 8:
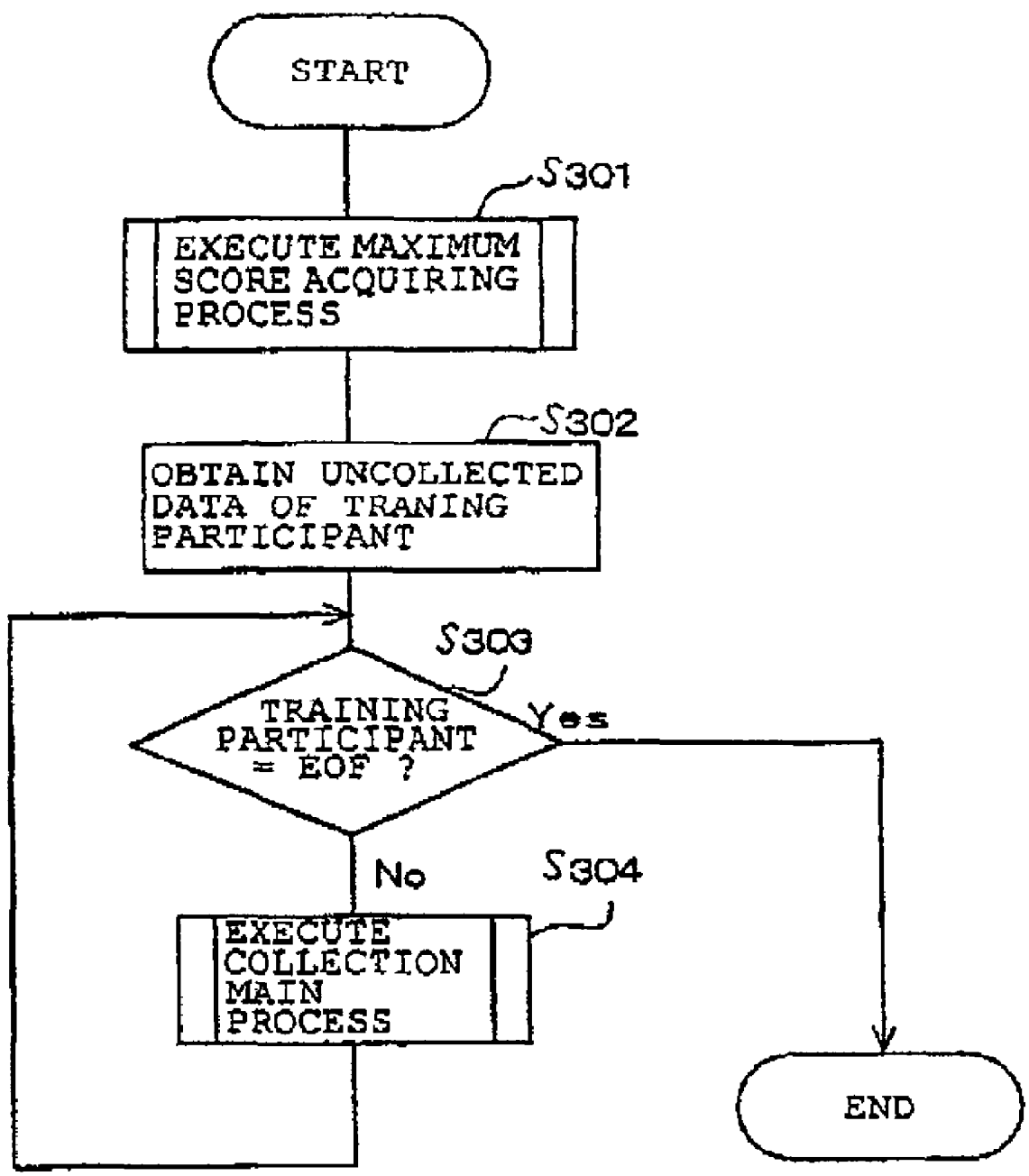
FIG. 8 is a flowchart showing the control process executed by the control unit in the embodiment.

Note that a processing procedure of checking a real operation time in the instruction item (the vehicle repairing technique), will be explained referring to FIGS. 6 and 7.

To start with, the training course is selected on the training center terminal 100 (step 201), and it is judged whether the training participant is a repeater (step 202). If the training participant is a participant for the first time, there are inputted individual information of the participant, information of the company for which the participant works and further contact information of the participant (steps 203–205), and the processing proceeds to step 207. Note that if the training participant is judged to be the repeater in step 202, a search process is executed in step 206, and, after various items of information the participant concerned are read from the storage device 126, the processing proceeds to step 207.

Then, a participation number, a date of participation, a training school and a name of the instructor who instructs the training participant, are inputted in step 207. Further, a repair target component that should be measured is selected (the repair target position where testing and repairing are done is selected). Then, a time spent for repairing the repair target component is inputted (step 209).

Next, the training center terminal 100 transmits and receives the training data containing a real work time inputted in step 209 to and from the head-office host computer 10 via the communication line C (step 210).

Then, the control unit 29 of the host computer 10 executes the collecting process in step 211 (FIG. 7), Further, in step 212, the control unit 29 displays a real work evaluation screen on the basis of the collecting process in step 211, and display a real time add-up table screen in step 213.

Moreover, the control unit 29 permits inputting a comment and executes a process of printing the real work evaluation table in step 214. Note that the control unit 29 transmits the data subjected to the print process in step 215 to the training center terminal 100 via the communication line C from the host computer 10, and the control unit 129 of the training center terminal 100 is capable of printing the real work evaluation table on the side of the training center terminal 100.

What has been described so far is the processing relative to the individual data of the training participant. Next, the processing about the data of the group of training participants will be explained referring to FIG. 17.

The control unit 29 of the host computer 10, when the group data as a target for creating a commendatory instruction curriculum are inputted through the keyboard 12 or the like (step 1101), reads from the storage device 26 the individual data of the training participant belonging to the group concerned (step 1102). Note that this group of participants cooperate to repair on the occasion of repairing the vehicle. One group consists of three or four workers (training participants). The number of participants forming the group is not, however, limited, and the group may consist of any number of participants. For example, all the workers at one company may be organized into one group. Namely, the control unit 29, if the target group is a work unit team, reads the training participant data containing the same company and assignment information as those of the target group data from pieces of individual information stored in the storage device 26. Further, if the target group is on the company basis, the control unit 29 reads the training participant data containing the same company information as those of the target group data from the individual information stored in the storage device 26.

Next, the control unit 29 adds up pieces of evaluation data of the respective training participants forming the target group for every instruction item, and calculates overall (total) evaluation data of the target group (step 1103).

Then, the control unit 29, based on the total evaluation data per instruction item that have been obtained in step 1103, compares the respective instruction items in terms of the total evaluation data, thus selecting the instruction item exhibiting a low degree of master among the whole instruction items (step 1104). When selecting the instruction item in step 1104, a single or a plurality of instruction items exhibiting the low degree of master may be selected. Further, standard data given beforehand per instruction item is set as a threshold value, and the instruction item having the total evaluation data lower than the standard data may also be selected as the instruction item exhibiting the low degree of master.

Next, the control unit 29 selects the training participant who should be instructed with respect to the instruction item (exhibiting the low degree of master) from the group. This selection may take, for example, the following three modes. That is, the first mode is that the control unit 29 compares the degree-of-master data of each training participant among the training participants of the group with respect to the concerned item with each other, and selects the instruction target participant having the low degree of master with respect to the instruction item concerned.

Further, the second mode is that the control unit 29 compares the degree-of-master data with respect to all the instruction items of each training participant among the training participants of the concerned group with each other, and selects the instruction target participant exhibiting the low degrees of master with respect to the instruction item concerned among the training participants excluding the training participants exhibiting higher degree of master with respect to the instruction items other than the concerned (selected) instruction item.

Moreover, the third mode is that the control unit 29 compares the degree-of-master data with respect to the concerned instruction item of the respective training participants belonging to the concerned group with each other, and selects the training participant exhibiting the high degree of master with respect to the instruction item concerned among those training participants.

The training participant given the priority of receiving the training of the instruction item concerned is selected in the way described above, thereby recommending the selected training participant to receive the training of the instruction item concerned and making it possible to facilities an improvement of the working capability of the group for a short period of time.

Further, the CAI system in this embodiment is capable of instructing the training participant efficiently precisely over a long period of time (lifelong instruction).

The present invention-is not limited to the contents in the embodiment discussed above and can be modified in many forms by those skilled in the art without departing from the scope of the gist according to the claims.

INDUSTRIAL APPLICABILITY

The CAI system according to the present invention is useful as a system schemed to improve the capability of the group consisting of the plurality of members and suited especially to a system for enhancing a working efficiency of the repair team consisting of the vehicle repair workers.

What is claimed is:

1. An instruction support system for supporting an instruction of one instruction target group consisting of a plurality of instruction target persons, comprising:
   storing means for storing attribute data of each instruction target person;
   inputting means for inputting degree-of-master basic data of each instruction target person with respect to each of a plurality of instruction items;
   instruction item evaluating means for evaluating a degree of master of each instruction target person with respect to each instruction item;
   instruction item overall evaluating means for calculating an overall evaluation of the concerned instruction item of one instruction target group on the basis of an evaluation result obtained by said instruction item evaluating means;
   instruction item selecting means for selecting the instruction item exhibiting a low degree of master by comparing the overall evaluations of the respective instruction items which are obtained by said instruction item overall evaluating means; and
   instruction target person selecting means for selecting which instruction target person is selected for receiving the instruction item selected by said instruction item selecting means.

2. An instruction support system according to claim 1, wherein said instruction target person selecting means selects the instruction target person exhibiting a low degree of master with respect to the instruction item selected by said instruction item selecting means among the instruction target persons.

3. An instruction support system according to claim 1, wherein said instruction target person selecting means selects the instruction target person exhibiting the low degree of master with respect to the instruction item selected by said instruction item selecting means among the instruction target persons excluding the instruction target persons exhibiting a high degree of master with respect to the instruction items other than the instruction item selected by said instruction item selecting means.

4. An instruction support system according to claim 1, wherein said instruction target person selecting means selects the instruction target person exhibiting a high degree of master with respect to the instruction item selected by said instruction item selecting means among the instruction target persons.

5. A readable-by-computer medium stored with a program for making a computer comprising inputting means for inputting data and storing means for storing attribute data of each of instruction target persons of one instruction target group consisting of a plurality of instruction target persons, execute:

evaluating a degree of master of each instruction target person with respect to every plurality of instruction items;

calculating an overall evaluation of one instruction target group with respect to the instruction item concerned on the basis of the degree of master that is evaluated and obtained with respect to every instruction item:

selecting the instruction item exhibiting a low degree of master by comparing the calculated overall evaluations of the respective instruction items with each other; and selecting which instruction target person who should be instructed with respect to the selected instruction item exhibiting the low degree of master.

* * * * *